Sept. 27, 1960  J. G. MILLER ET AL  2,953,817
METHOD OF FORMING PLASTIC CONTAINERS
Filed July 1, 1957  2 Sheets-Sheet 1

INVENTORS
JOHN G. MILLER &
BY RAYMOND H. REX
Rule and Hoge
ATTORNEYS

Sept. 27, 1960     J. G. MILLER ET AL     2,953,817
METHOD OF FORMING PLASTIC CONTAINERS
Filed July 1, 1957     2 Sheets-Sheet 2

INVENTORS
JOHN G. MILLER
RAYMOND H. REX.
BY
ATTORNEYS

United States Patent Office 2,953,817
Patented Sept. 27, 1960

2,953,817

METHOD OF FORMING PLASTIC CONTAINERS

John G. Miller and Raymond H. Rex, Toledo, Ohio, assignors to Owens-Illinois Glass Company, a corporation of Ohio Filed July 1, 1957, Ser. No. 669,130

5 Claims. (Cl. 18—55)

Our invention relates to a method of making hollow articles such as bottles and other containers formed of materials in a moldable plastic condition. The invention may be practiced with the various thermoplastics which are used at the present day for making such articles.

In accordance with one prior art extrusion method for making bottles or containers of thermoplastic materials, a neck-forming mold is brought into contact with an extrusion die and the thermoplastic material is extruded to form the neck portion of the article. The neck mold is then retracted while the extrusion is continued to thereby form a tubular body portion integral with the molded neck. The body portion is then expanded within a finishing mold to form the body portion of the article. In accordance with such method, the distribution of the material is not uniform, the central wall portions being stretched and expanded so that the walls are comparatively thin while portions adjacent to the neck remain undesirably thick.

An object of the present invention is to overcome this objection and to obtain a desirable distribution of the material and control of the wall thickness of all portions of the molded article by a novel method of forming the article.

In accordance with our invention, the neck-forming mold is brought into engagement with an extrusion die and plastic material is extruded from the annular orifice of the die into the neck mold cavity, thereby molding the neck portion of the article. The neck mold is then retracted a limited distance from the extrusion die while the extrusion is continued. Air under pressure is introduced into the tubular body of material as it is formed during such retraction of a neck mold, thereby expanding the material to a bulb-like form. Thereafter, during continued retraction of the neck mold concurrently with a continued extrusion from the die, a body-forming tubular portion is formed integral with the expanded bulb, while at the same time the expanded bulb is stretched so that side walls are straightened. Thereafter, the extruded material is expanded by air pressure within a finishing mold. By such method, the bulb-like portion of the blank expanded to form the shoulder portion of the molded article in a manner to obtain the desired distribution and wall thickness of the material.

Referring to the accompanying drawings which illustrate one form of apparatus for use in making hollow articles in accordance with the present invention:

Figure 1:
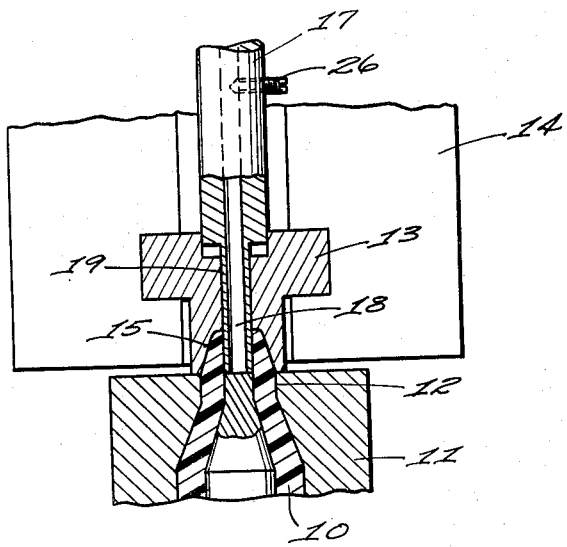
Fig. 1 is a fragmentary sectional elevation showing an extrusion die and a neck mold and illustrating an initial step in the method of forming the article.

Referring to Fig. 1, the thermoplastic material 10, which may be in a heated, plastic, moldable condition, issues from a supply body through an extrusion die 11 having an annular outlet orifice 12. A neck ring or mold 13 which comprises partible sections is mounted in a neck ring head 14. The neck ring is formed with a neck mold cavity 15 which registers with the orifice 12 when the neck ring is seated on the extrusion die. A cylindrical mold core 17 is formed with a central bore 18 through which air is supplied for preventing collapse of the material as it is extruded into the open. Air under pressure is also supplied through the bore 18 for blowing the article to finished form as hereinafter described. The core 17 is formed with a tubular stem 19 around which the neck ring 13 closes, said stem extending downward to the level of the lower end of the neck ring so that it seats on the extrusion die 11 and forms the inner wall of the neck mold cavity 15.

Figure 2:
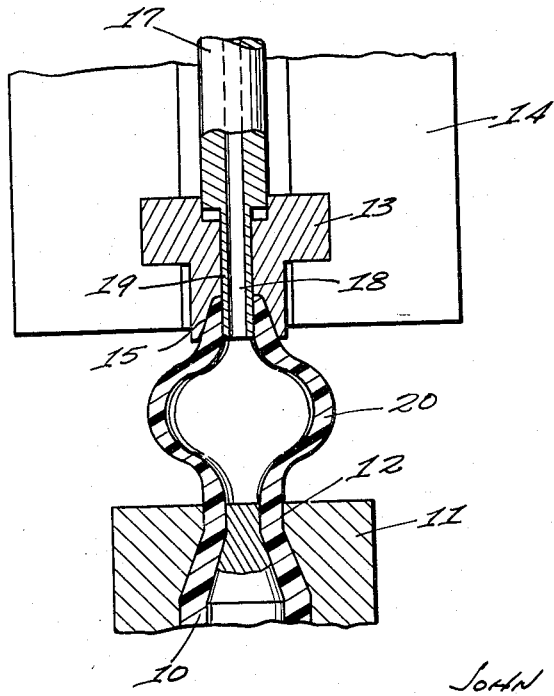
Fig. 2 is a similar view showing a succeeding step.
Figure 3:
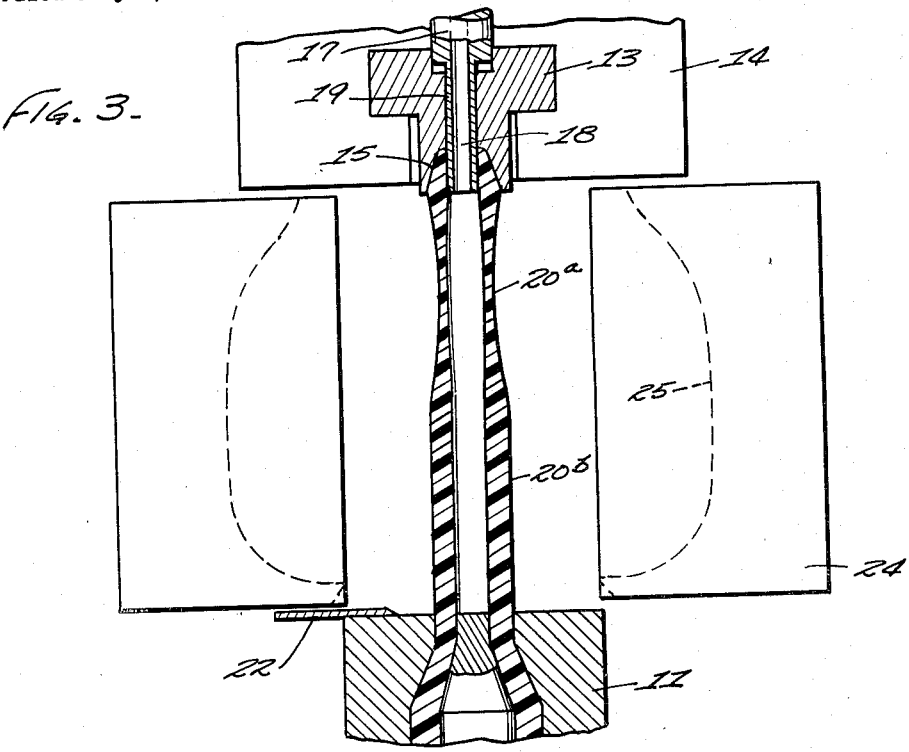
Fig. 3 is a sectional elevation showing a further step by which the extrusion has been completed.

While the neck ring is closed and seated on the extrusion die and after the neck ring cavity is filled with the molding material 10, the neck ring is moved upwardly or the extrusion die withdrawn downwardly, while extrusion of the material is continued and the parts brought to the relative positions shown in Fig. 2. During this operation, air is supplied through the core 18. The air pressure during or following such operation is sufficient to expand or bulge the material to the bulbous form 20. The air pressure is then discontinued or reduced while retracting the movement of the neck ring and extrusion of material from the die 11 are continued until the parts are brought into the relative position shown in Fig. 3. During this continued operation, the bulb 20 is stretched to a cylindrical form 20a. The main body portion 20b of the extruded blank is prevented from collapsing and assumes a substantially cylindrical form, as shown, by the air at atmospheric pressure supplied through the bore 18. The walls of the part 20a are comparatively thin owing to the stretching of the bulb 20.

Figure 4:
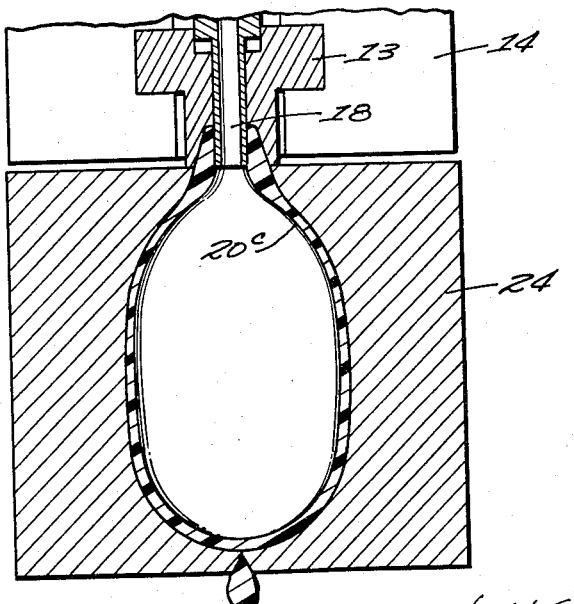
Fig. 4 is a sectional elevation showing the finishing mold closed around the body of the article and the latter expanded to final form.

The extruded blank may be severed from the extruder by a blade 22. A finishing mold 24, comprising partible mold sections, is then closed around the blank and the latter blown to final form in the finishing mold cavity 25 by air pressure applied through the bore 18. Fig. 4 shows the blown article within the finishing mold. It will be seen that the wall portions 20a (Fig. 3) which form the shoulder portion 20c in the finished article are stretched to a less extent during the expansion in the finishing mold than the comparatively thick wall portions 20b of the blank which are stretched through a greater distance, so that in the finished article these wall portions are of substantially uniform thickness. In this manner, a desired distribution of the material is obtained.

A screw-threaded plug 26 (Fig. 1) is threaded through the wall of the core 17 to project into the bore 18. This plug may be used as an adjustable throttle valve to restrict the flow of air to any desired extent.

Modifications may be resorted to within the spirit and scope of our invention as defined in the appended claims.

We claim:

1. The method of making an article of moldable plastic material, which method comprises extruding a portion of the material through an annular outlet orifice into the open and thereby forming a tubular section of the material while subjected externally to atmospheric pressure, expanding said tubular section to a bulbous form by super-atmospheric pneumatic pressure applied internally of said section, continuing the extrusion of the material into the open and thereby forming an additional tubular section of the blank integral with the bulbous section, stretching said bulbous section while in the open and thereby reshaping it to substantially cylindrical form integral with said additional section and of lesser wall thickness than said additional section, and enclosing all of said blank in a mold and blowing the blank to a final article form.

2. The method of forming a hollow body which comprises extruding moldable plastic material from an extruder into a juxtaposed neck mold cavity and thereby molding a neck portion of the article, thereafter effecting a relative movement of the extruder and neck mold away from each other while continuing the extrusion of said material into open space between the extruder and neck mold and thereby forming a tubular section of the material integral with said neck portion, expanding said tubular section adjacent the neck portion to a bulbous form by super-atmospheric pressure applied internally of said tubular section, thereafter ceasing the expansion and continuing the extrusion thereby forming a tubular section integral with said bulbous section, stretching the bulbous section to a tubular section of reduced wall thickness, enclosing both tubular sections in a finishing mold, and expanding the material within the finishing mold.

3. The method of forming a hollow article which comprises bringing into juxtaposition a neck mold having a neck mold cavity and an extrusion die having an annular outlet orifice, with said orifice in register with the neck mold cavity, extruding plastic moldable material through said orifice into the neck mold cavity and thereby filling said cavity and forming the neck of said article, thereafter separating the neck mold and extrusion die by a retracting movement of the neck mold relative to said die, continuing the extrusion during said retracting movement and thereby forming a tubular section of said material integral with the said neck, expanding said tubular section by pneumatic pressure applied internally thereof and thereby reforming said section to a bulbous form, continuing the said retracting movement and concurrently continuing the extrusion of said material to form an additional tubular section, stretching the bulbous section lengthwise during the formation of said additional section and thereby reshaping it to substantially straight tubular form and reducing the wall thickness of said bulbous section by the stretching operation closing a finishing mold around the blank and blowing the blank within the finishing mold.

4. The method of forming a tubular blank of moldable plastic material which comprises extruding the material while in a moldable plastic condition through an outlet orifice into the open in tubular form from a supply body of the material, applying pneumatic pressure within the tubular body of material sufficient to expand it to a bulbous form, thereafter reducing the said pressure while continuing extrusion of the material, stretching said bulbous portion during said continued extrusion to substantially cylindrical form and reducing the wall thickness thereof, thereby forming a substantially tubular blank with one portion of the blank having comparatively thin walls and another portion thereof having comparatively thick walls, enclosing the blank within a mold and blowing the blank to expand its form within the bulb.

5. The method of controlling the wall thickness of a plastic article which comprises extruding moldable plastic material into the open through an annular outlet orifice and thereby forming a tubular section of the material, expanding a portion only of said tubular section while in the open to bulbous form by applying a differential pneumatic pressure to the inner and outer wall surfaces of said section during extrusion, continuing the extrusion into the open to form an additional tubular section integral with said expanded section, stretching said expanded section lengthwise to substantially cylindrical form having a wall thickness less than that of additional tubular section, enclosing the two tubular sections in a mold and blowing the sections in the mold to a final article configuration.

References Cited in the file of this patent

UNITED STATES PATENTS

| | | |
|---|---|---|
| 1,892,126 | Bailey | Dec. 27, 1932 |
| 2,315,478 | Parkhurst | Mar. 30, 1943 |
| 2,632,202 | Haines | Mar. 24, 1953 |
| 2,634,459 | Irons | Apr. 14, 1953 |
| 2,790,994 | Cardot et al. | May 7, 1957 |
| 2,804,654 | Sherman | Sept. 3, 1957 |